(12) United States Patent
Omoto et al.

(10) Patent No.: US 7,299,197 B2
(45) Date of Patent: Nov. 20, 2007

(54) ELECTRONIC MAIL SYSTEM (75) Inventors: Narihiro Omoto, Toda (JP); Toshikazu Takigawa, Yachiyo (JP)

(73) Assignee: Hitachi, Ltd., Tokyo (JP)

( * ) Notice: Subject to any disclaimer, the term of this patent is extended or adjusted under 35 U.S.C. 154(b) by 628 days.

(21) Appl. No.: 10/082,674

(22) Filed: Feb. 22, 2002

(65) Prior Publication Data
US 2002/0178081 A1   Nov. 28, 2002

(30) Foreign Application Priority Data
Feb. 22, 2001   (JP)   ............... 2001-045945

(51) Int. Cl.
G06Q 30/00   (2006.01)
(52) U.S. Cl. ...................................... 705/26
(58) Field of Classification Search ................... 705/26
See application file for complete search history.

(56) References Cited
U.S. PATENT DOCUMENTS
5,892,900 A * 4/1999 Ginter et al. ............... 713/200

FOREIGN PATENT DOCUMENTS
JP   2006190144 A  *  8/2006

OTHER PUBLICATIONS
"Web-based IDE holds much potential", Daniel Mann, Electronic Engineering Times.Manhasset: Aug. 4,997, Issue 965, p. 68, 4 pages.*

* cited by examiner

Primary Examiner—James Zurita
(74) Attorney, Agent, or Firm—Townsend and Townsend and Crew LLP (57) ABSTRACT An electronic mall system is constituted of an ASP electronic mall and an ASP registration DB. Applications available for selection are represented as icons and a common execution screen is generated. The icons are linked with the ASP registration DB. The accounts are settled with each user and each ASP by measuring the application utilization time of the user and collating it with the ASP registration DB. A high-performance infrastructure environment is provided to support ASPs.

2 Claims, 8 Drawing Sheets

UTILIZATION TIME MANAGEMENT FILE FOR EACH ASP APPLICATION

FILE A:

| USER NAME \ ASP/AP NAME | ASP1/AP1 | | ASP1/AP2 | | ... | |
|---|---|---|---|---|---|---|
| | START | END | START | END | START | END |
| A | 000110 | 000110 | 010110 | 000110 | ... | ... |
| A | 000000 | 000050 | 020110 | 000100 | ... | ... |
| A | 000000 | 000110 | 000110 | 000110 | ... | ... |
| ⋮ | ⋮ | ⋮ | ⋮ | ⋮ | ⋮ | ⋮ |

FILE B:

| B | 000000 | 000050 | 020110 | 000100 | ... | ... |
| B | 000000 | 000110 | 000110 | 000110 | ... | ... |
| B | ⋮ | ⋮ | ⋮ | ⋮ | ⋮ | ⋮ |

FILE C:

| C | 000000 | 000110 | 000110 | 000110 | ... | ... |
| ⋮ | ⋮ | ⋮ | ⋮ | ⋮ | ⋮ | ⋮ |

| USER NAME | USER ID | PASSWORD | VALIDITY TERM |
|---|---|---|---|
| A | 356991001 | 111111 | 20000531 |
| B | 356991002 | 222222 | 20000921 |
| C | 356991003 | 333333 | 20000921 |
| ⋮ | ⋮ | ⋮ | ⋮ |
| ASP1 | ASP1003 | ASP1111 | 20010206 |
| ASP2 | ASP1004 | ASP2222 | 20010921 |
| ⋮ | ⋮ | ⋮ | ⋮ |

ELECTRONIC MAIL SYSTEM

BACKGROUND OF THE INVENTION

The present invention relates to an ASP electronic mall for providing a user with the service of a plurality of application service providers (hereinafter referred to as ASP) at a single point, or in particular to a system capable of handling a plurality of applications with the same interface for collectively settling a plurality of accounts between a user and a plurality of ASPs.

The ASP is an application service provider which has recently been closely watched. The ASP has an application in its own server, and the application user accesses the ASP server through an internet to execute the application. The user can use an application without purchasing it in the same manner as if it works on his own PC, and pays the utilization charge according to the time used. This system has the advantage that the application can be used any time and can cease to be used any time. Also, an application version-up, if performed on the ASP server, can readily reflect the user requirements.

In the prior art, each ASP has provided an application at a different position. In other words, servers are dispersedly located, and therefore the user is required to sign a one-to-one agreement with each ASP. As a result, the utilization agreement is required to be signed and the account to be settled with each ASP, Therefore, the applications of different ASPs cannot be easily utilized in combination. Also, the applications that can be offered by each single ASP are limited. Further, it is difficult for a user to find an optimum application from the applications of a multiplicity of ASPs. Each ASP providing a service is required to prepare and manage the operation of a server by itself. This leads to an equipment situation in which a service cannot be provided quickly in response to a request.

In view of this, an ASP electronic mall based on the concept of an electronic mall has been devised. In what is called the electronic mall generally available, however, only the tags of the commodities dealt in by the electronic mall exist, and actual commodities are located in each store. Thus, the conventional electronic mall mainly provides a place of information exchange. Also, the price is determined for each commodity, whereas the service charge for the application provided by the ASP is calculated based on the amount of utilization. Further, it is difficult to meet the desire of the user to test use a given commodity dealt in by the electronic mall.

SUMMARY OF THE INVENTION

The object of the present invention is to provide an improved ASP mall system advantageously utilized by both the user and ASP based on the concept of the generally known electronic mall, in which the applications of a plurality of ASPs are concentrated at a point as an ASP mall so that each user can utilize the applications of a multiplicity of ASPs under a single agreement, while each ASP is required to have no infrastructure, and can provide programs which can be started only on a main application offered by other ASPs.

In order to achieve the object described above, according to this invention, there is provided an electronic mall system comprising storage means for registering the execution applications of a plurality of application service providers (ASP), means for settling the utilization charge to be paid by the users in accordance with the amount of utilization of each application and the application service charge acquired by the ASPs, means for generating ASP registration information in ASP registration storage means in response to a request, if any, from an ASP for registration of an application, and means for executing the applications of a plurality of different ASPS.

A single place accessible by both the users and the ASPs is formed in the ASP electronic mall system according to the invention. The ASP electronic mall system comprises an ASP mall server, a membership data base (DB) and an ASP registration DB. The users and the ASPs qualified to access the electronic mall system are registered as members in the membership DB, and managed by an ID and a password issued to each of them.

The membership DB is configured of the name, the ID, the password and the term of validity. Each ASP registers at least an application in an ASP registration DB 105, together with the ASP name, the application name, the utilization charge, the name of a link application and the category name at the same time. The user can utilize the applications of a plurality of ASPs at a point by accessing the ASP registration DB 105. Also, the user can receive the service from a plurality of ASPs under a single agreement. The user searches the ASP registration DB 105 for a desired application using, for example, the category as a key. The application thus selected is executed on the same interface of the ASP mall server regardless of the source ASP.

The execution on the same interface means that the applications of a plurality of different ASPs can be handled on the same screen (window). An application can be called and executed on an execution screen of WEB, and thus the ASP electronic mall can be used in the same manner as if a plurality of applications including the word processor and the spreadsheet program are booted and used at the same time. By clicking the icons of applications of companies A and B, for example, they can be booted and used on the same screen at the same time. Exchange between applications is also possible as far as the data are compatible.

In the case where an application is utilized, the utilization start time is recorded, and at the end of the utilization of an application, the utilization end time is recorded. In this way, the application utilization time is managed for each ASP. The utilization time length is collated with the application utilization charge rate per unit time stored in the ASP registration DB 105 to calculate the amount of the actual utilization charge, and the account is settled for each ASP. The account with each user is settled by totalizing the application utilization charges of the ASPs accessed by him. In the case where the user is desirous of test using the performance of a given application, the application is called in bench mark mode, and the application start time is not recorded even if the application is started. In such a case, the application utilization time length is limited, and the management whether the application is utilized within the limit is performed by obtaining the utilization time length. In the case where the predetermined time length is exceeded, however, the normal utilization charge is levied by recording the start time. The ASP can thus utilize a high-speed network infrastructure and system resources. Even a (subsidiary) program which can be started only on a given main application can also be registered alone in the ASP registration DB 105, and therefore an ASP qualification can be easily acquired. The ASP electronic mall system has many features as described above.

The term ASP, as described above, is an abbreviation of the application service provider, who does not sell the system to the user, but provides the utilization of an application under a lease agreement. Each application is not installed on the user side, and a server is arranged at an ASP center, so that each ASP can mainly provide a package software through an internet, VPN or WAN.

Other objects, features and advantages of the invention will become apparent from the following description of the embodiments of the invention taken in conjunction with the accompanying drawings.

DESCRIPTION OF THE EMBODIMENTS

An embodiment of the invention will be explained below with reference to the drawings. The description that follows concerns only an example of carrying out the invention, and in any way is not intended to limit the scope of the invention.

Figure 1:
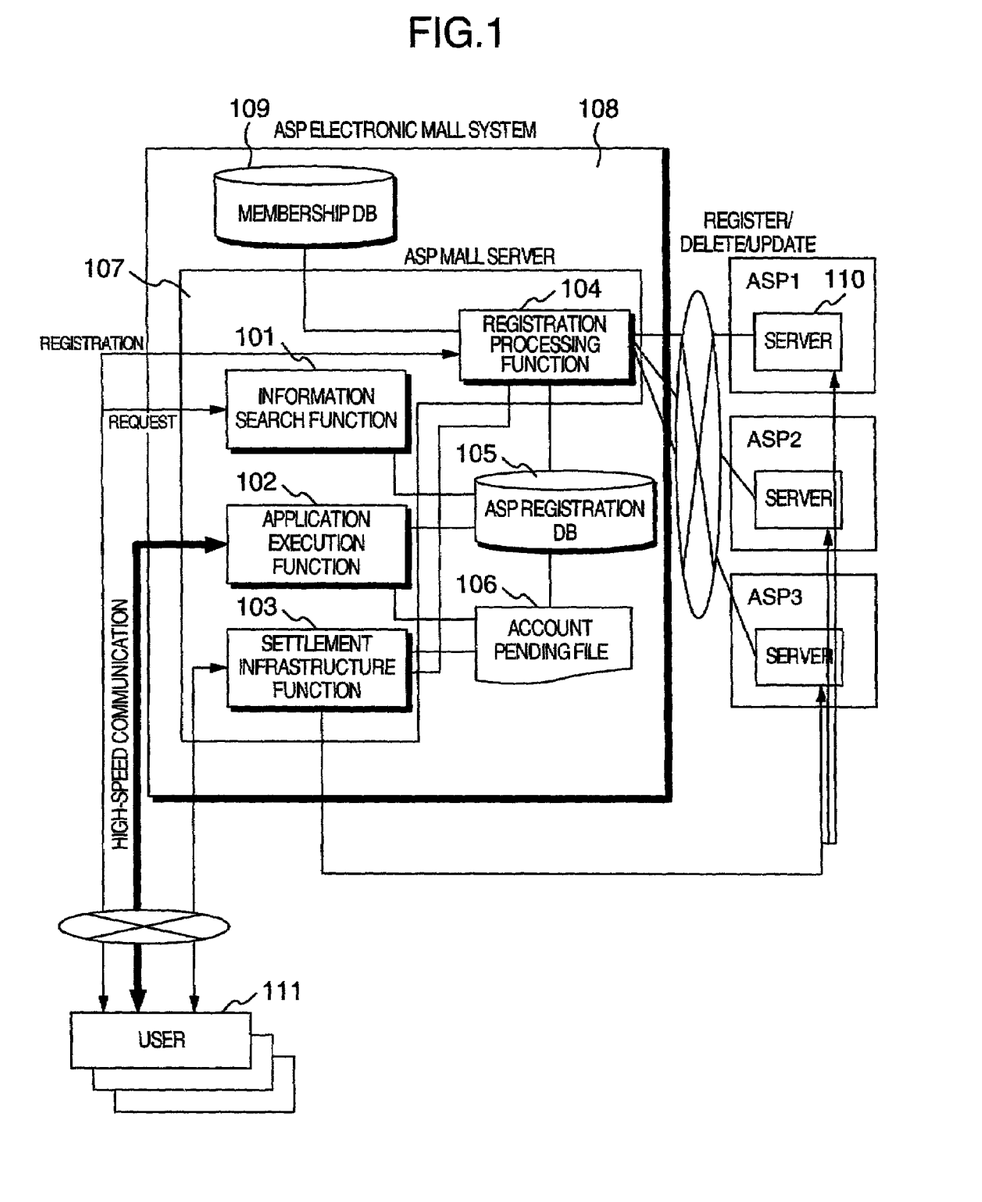
FIG. 1 is a diagram showing a general configuration for explaining the relation between an ASP electronic mall, ASPs and application users according to an embodiment of the invention.

FIG. 1 is a diagram for explaining a general system of an ASP electronic mall. The ASP electronic mall is what is called an application shopping center, in which a plurality of applications provided by a plurality of ASPs are prepared and various services for utilizing the applications are offered to the users. Each user can utilize any of the applications by connecting his terminal 111 to the ASP electronic mall through a high-speed line. The ASP electronic mall system 108 is configured of an ASP mall server 107, an ASP registration DB 105 and a membership DB 109. The ASP electronic mall is a membership system in which application users and ASPs are required to register beforehand. The registered data are stored and managed in the membership DB 109. The applications offered by the ASPs are registered in the ASP registration DB 105. The ASP mall server 107 includes a registration processing function 104, a registered information search function 101, an application execution function 102 and a settlement infrastructure function 103. The registration processing function 104 operates to write the necessary information in the membership DB 109 and the ASP registration DB 105 at the time of new registration of a user or an ASP. The information search function 101 connects an application meeting the needs of the user to the ASP registration DB 105 and supplies the result of the search. The settlement infrastructure function 103 records the application utilization start time and the application utilization end time in the account pending file 106 for any user who may utilize an application. The record in the account pending file 106 is collated with the utilization charge recorded in the ASP registration DB 105 thereby to perform the process for settling the accounts with the user and the ASP. Each ASP connects his server 110 to the ASP electronic mall server 107 to register, delete or change an application.

Figure 2:
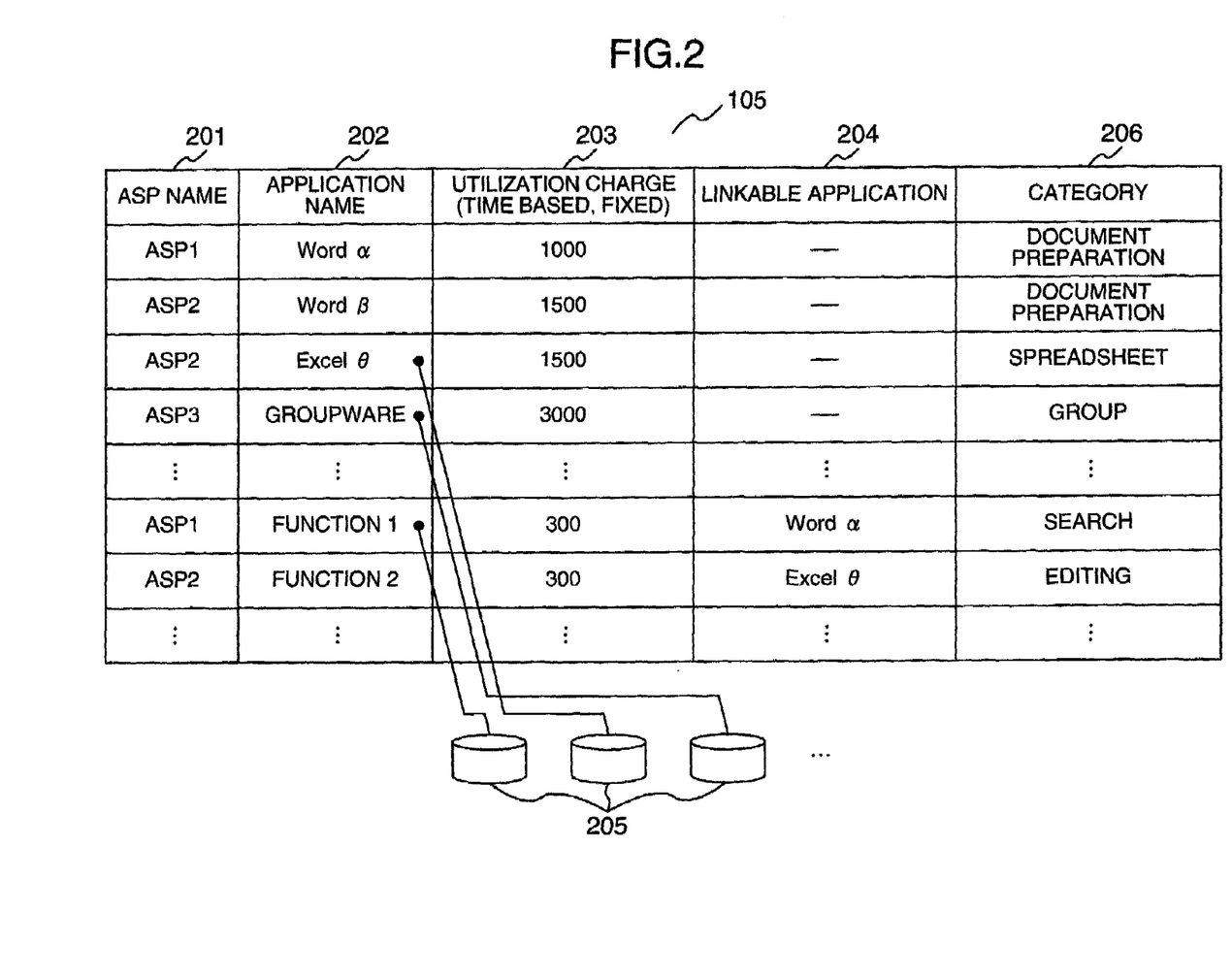
FIG. 2 is a diagram showing a data structure of an ASP registration DB 105 according to an embodiment of the invention.

FIG. 2 is a diagram showing the data structure of the ASP registration DB 105 and the linkage between the data and applications. The ASP registration DB 105 is an application management DB, and each record stored therein is configured of an ASP name 201, an application name 202, a utilization charge 203, linkable application information 204 and an application category 206. The ASP name 201 is a character string indicating each of the providers of the registered applications, and the application name 202 a character string indicating each of the registered application names. The utilization charge 203 is numerical information indicating the charge system information for each application. The linkable application name 204 is a character string indicating each of the names of other applications with which a given application can be linked. The category name 206 is a character string indicating a category classification tag associated with an intended application providing a key for the user to make a search,. A given application name 202 is linked with one of application bodies 205, so that an application body 205 is started and executed upon selection of an application associated therewith.

Figure 3:
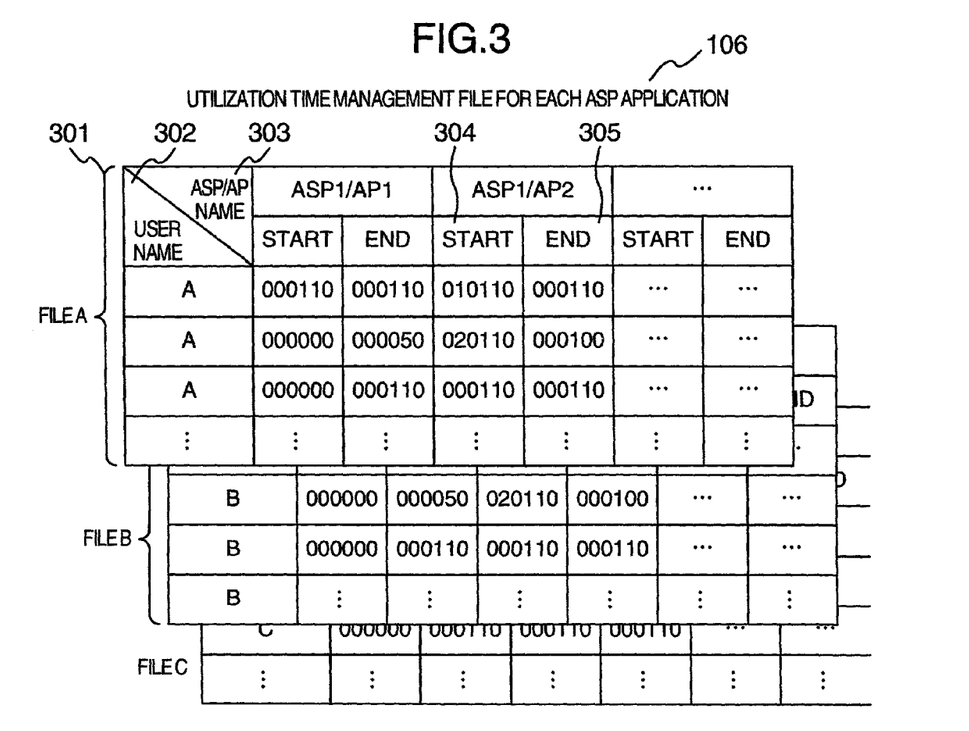
FIG. 3 is a diagram showing a record structure of an account pending file according to an embodiment of the invention.

FIG. 3 is a diagram showing a structure of account pending files 106. The account pending file 106 is generated for each user. A file A 301 is an application utilization management file for the user Mr. A. The user name 302 is a character string indicating the name of the user that has utilized an application. An ASP/AP name 303 is a character string indicating the name of a source ASP and an application name. Each record is configured of a repetitive structure including a start 304 and an end 305 for each application. The start 304 is a numerical value at which a given application is started by the user. The end 305 is a numerical value indicating the time at which the utilization of a given application ends.

Figure 4:
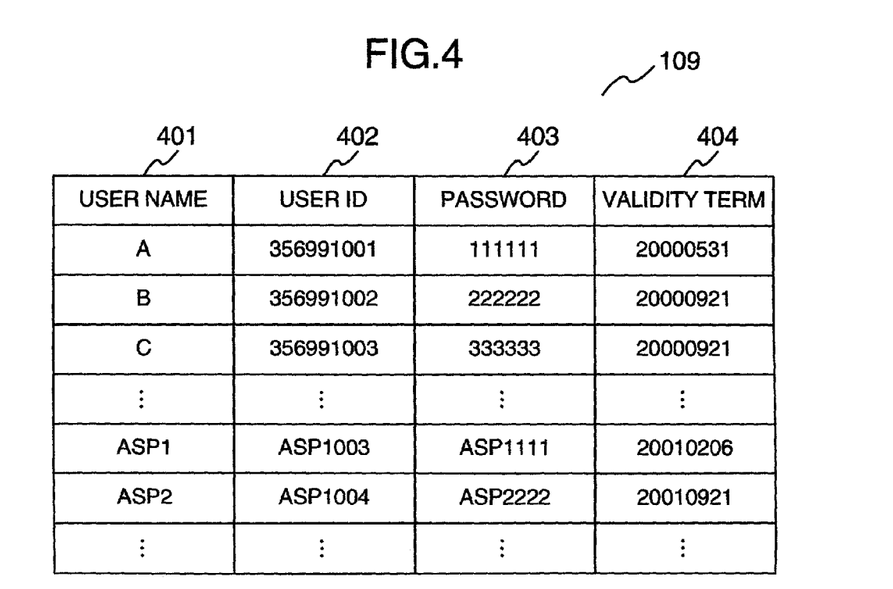
FIG. 4 is a diagram showing a data structure of a membership DB 109 according to an embodiment of the invention.

FIG. 4 is a diagram showing a data structure of the user membership DB 109. Each record is configured of a user name 401, a user ID 402, a user password 403 and a term of validity 404. The user name 401 is a character string indicating the name of the user utilizing an application and the ASP name. The user ID 402 is a user management identifier for managing the membership information. The password 403 is the password information for logging in to the ASP electronic mall. The validity term 404 is a numerical value indicating the term of validity of the ASP electronic mall for the user utilizing the application and the ASP.

Figure 5:
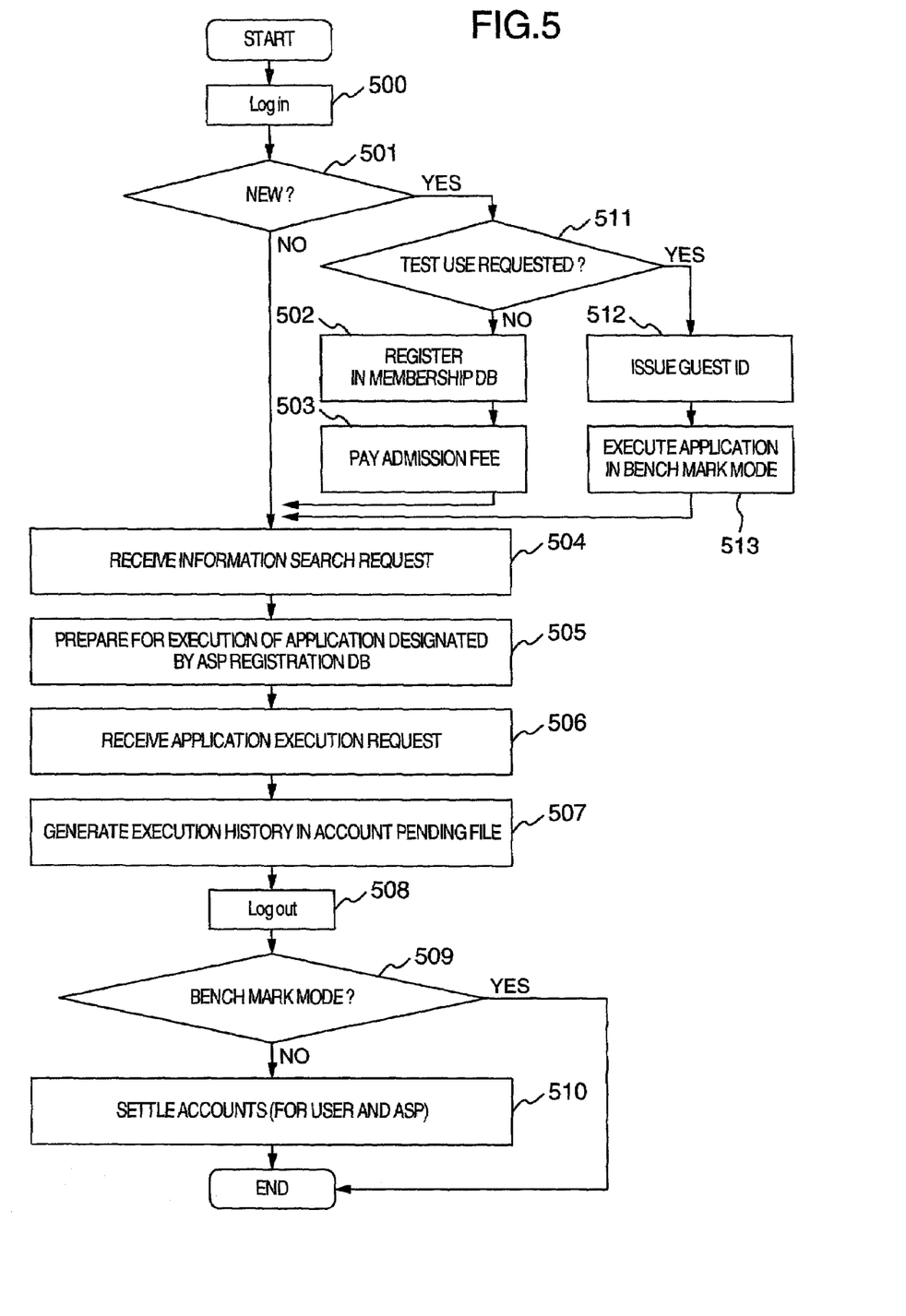
FIG. 5 is a flowchart showing the process performed in the whole system according to an embodiment of the invention.

FIG. 5 is a flowchart showing the whole process of the ASP electronic mall system. A user who has accessed the ASP electronic mall system 108 logs in to the ASP mall server 107 (step 500). In the case where the user acquires the membership for the first time (YES in step 501) without any request for test use (NO in step 511), the necessary items are registered in the membership DB 109 (step 502) and the account is settled for the admission fee (step 503). In the case where the user requests a test use (YES in step 511), on the other hand, a provisional guest ID is issued to the user, and the execution of the application becomes possible in bench mark mode (step 513). After that, the process proceeds to step 504. In the case where the user has already acquired a membership (NO in step 501), the search request information is received from the user (step 504), and the application involved is retrieved from the ASP registration DB 105 and set in usable state (step 505). The application that has become executable and the function thereof are executed by an application execution function 102 upon receipt of an application execution request (step 506). At the same time, the history of utilization of the application is generated in the account pending file 106 (step 507) and managed. Once the user logs out of the ASP mall server 107 (step 508), the process is terminated if the application is in bench mark mode (YES in step 509). In the case where the application is not in bench mark mode (NO in step 509), on the other hand, the utilization charge of the user and the application service charge for the ASP are settled (step 510).

Figure 6:
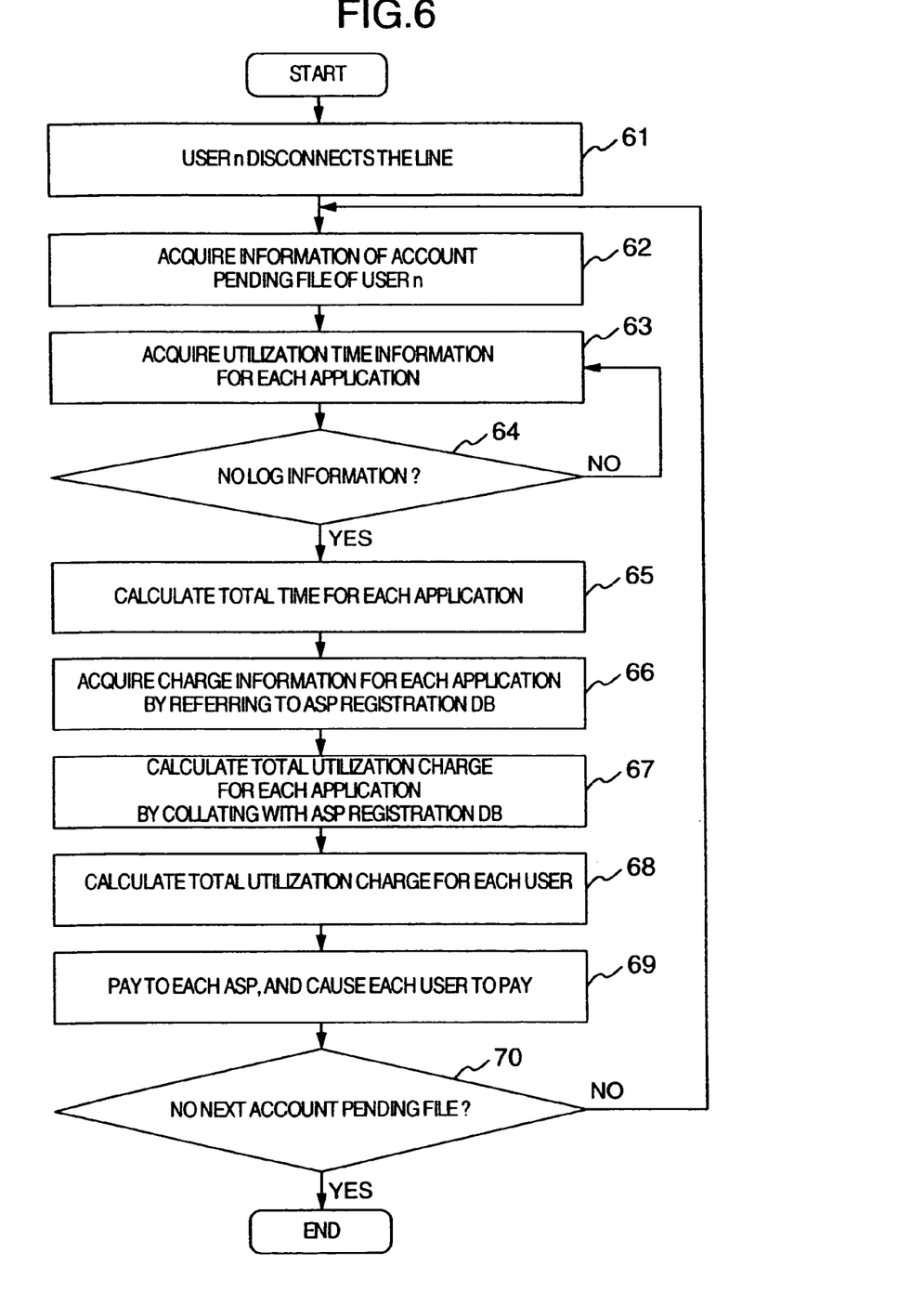
FIG. 6 is a flowchart showing the process for account settlement by a settlement infrastructure function 103 according to an embodiment of the invention.

FIG. 6 is a flowchart showing the process performed by the settlement infrastructure function 103. In the case where a user n that has thus far been connected to the ASP mall server logs out (step 61), the information for the user n in the account pending file 106 is acquired by the settlement infrastructure function 103 (step 62). The utilization time length of each application is acquired for each record from the start 304 and the end 305 (step 63). In the presence of the next log information (record) (NO in step 64), the particular record is read. In this way, the time consumed for utilization of each application is acquired (step 63). In the absence of the next record (YES in step 64), on the other hand, the total utilization time of each application is calculated (step 65). By referring to the ASP registration DB 105, the price 203 of each application is acquired (step 66). Based on the price 203 thus acquired and the total utilization time of each application, the total amount of the utilization charge of each application is calculated (step 67). The amounts of the total utilization charge of all the applications utilized by the user are summed up to calculate the total amount of the utilization charge of the user n, and the process for settling the account with the user n is carried out (step 68). Also, the amount of the application service charge is calculated for each ASP and the process for paying the amount to each ASP is carried out (step 69). In the presence of the next account pending file 106 (NO in step 70), the particular account pending file 106 is read to acquire information (step 62). In the absence of the next account pending file 106 (YES in step 70), on the other hand, the settlement process is terminated.

Figure 7:
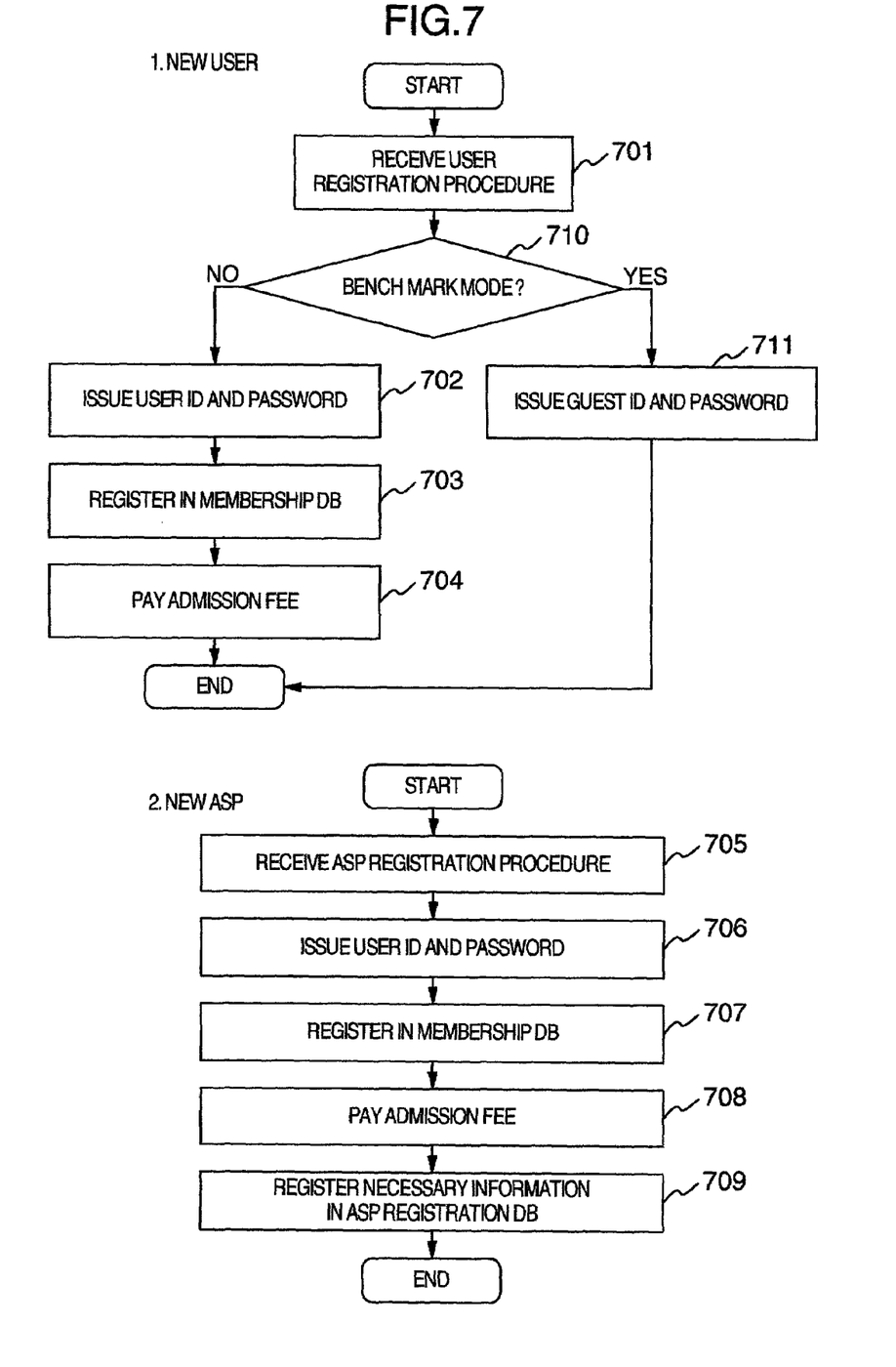
FIG. 7 is a flowchart showing the process for registration by a registration processing function 104 according to an embodiment of the invention.

FIG. 7 includes a flowchart 1 of the process for registering a new user and a flowchart 2 of the process for registering a new ASP. First, the flowchart 1 will be explained. Assuming that an application for registration is received from a new user (step 701) requesting the test use of an application in bench mark mode (YES in step 710), the registration processing function 104 issues a guest ID (step 711). In the case where an application for membership is filed without requesting the test use of an application in bench mark mode (NO in step 710), on the other hand, the registration processing function 104 issues and sends a user ID and a password to the prospective user (step 702). The registration information required for the new user is registered in the membership DB 109 (step 703). After that, the settlement processing infrastructure 103 is connected to perform the process for paying the admission fee (step 704). The flowchart 2, in which the new user is replaced with the new ASP, shows a membership registration process similar to the flowchart 1, and therefore will not be described in detail.

Figure 8:
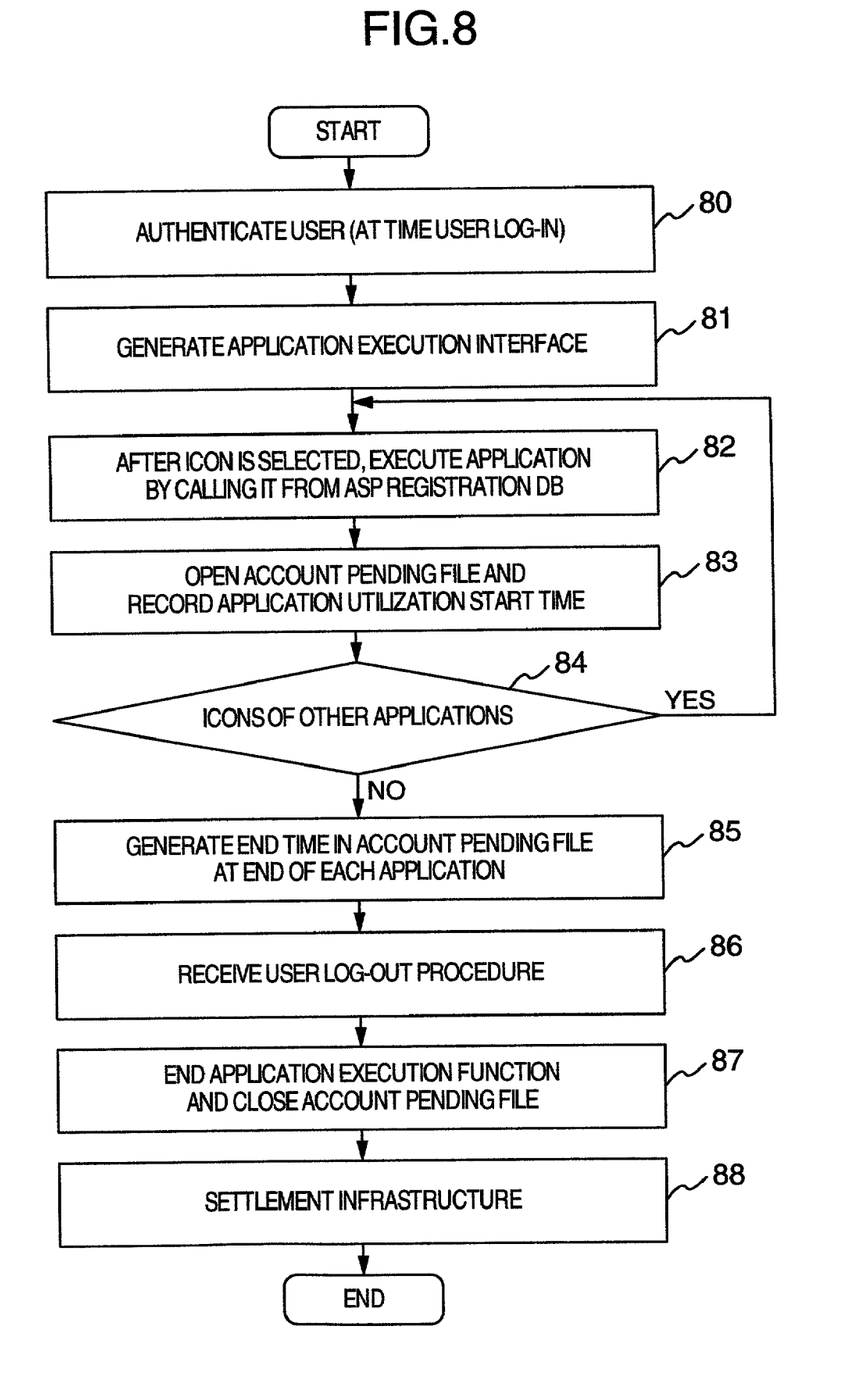
FIG. 8 is a flowchart showing the process for application execution by an application execution function 102 according to an embodiment of the invention.

FIG. 8 is a flowchart for carrying out the application execution function 102. Once the user logs in and is authenticated successfully (step 80), an application execution interface is generated (step 81). The application execution interface is a user interface configured of icons indicating available applications and an application execution screen. Once the application icon is selected, the application execution function 102 calls out and executes the particular application from the ASP registration DB 105 (step 82). After executing the application, the account pending file 106 is opened and the start time is recorded (step 83). Upon selection of another application icon (YES in step 84), on the other hand, the process proceeds to step 82. In the case where another application is not selected (NO in step 84), on the other hand, the end time is recorded in the account pending file 106 at the end of utilization of the application (step 85). A log-out request from the user is accepted at the end of utilization of all the applications (step 86). Thus, the application execution function 102 is terminated and the account pending file 106 is closed (step 87).

The contents of the account pending file 106 are read and processed in the settlement processing infrastructure 103 (step 88).

Figure 9:
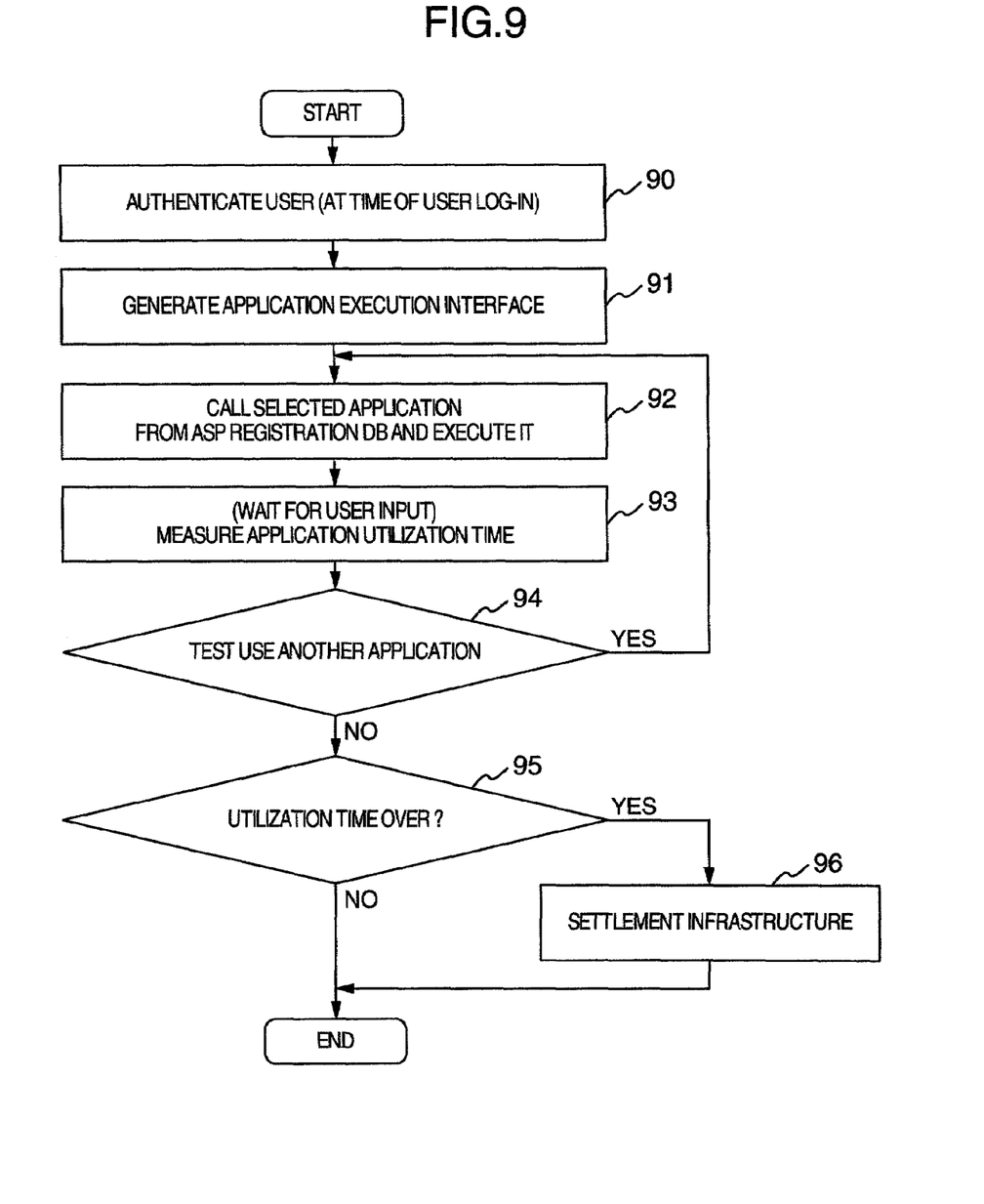
FIG. 9 is a flowchart showing the process for executing an application in bench mark mode by the application execution function 102 according to an embodiment of the invention.

FIG. 9 is a flowchart showing the bench mark function of a given application constituting a part of the application execution function 102. The bench mark function is for evaluating, in advance, an application to be utilized by the user. This function permits the user to search for an application suitable for the process desired by him on the one hand and makes it possible to determine the degree to which applications are linked to each other on the other hand. No charge is levied as long as the user is utilizing an application in bench mark mode. First, the user is authenticated at the time of log-in, and if the result is OK (step 90), an application execution interface is generated (step 91). Once an application icon is selected, the application execution function 102 calls the particular application from the ASP registration DB 105 and executes it (step 92). While the user is evaluating the application, the next input from the user is awaited. At the same time, the time length during which the application is test used is measured (step 93). In the presence of another application to be test used (YES in step 94), the process proceeds to step 92. In the case where the utilization time limit of the application is exceeded (YES in step 95) in the absence of any other application to be test used (NO in step 94), on the other hand, the charge for the excess time is levied by the settlement processing infrastructure 103 (step 96). Unless the utilization time limit of the application is exceeded (NO in step 95), on the other hand, the bench mark mode is terminated as it is.

Now, an explanation will be given of the operation of the ASP electronic mall system 108 in the case where the user utilizes an application by accessing the electronic mall.

The user accesses the ASP mall server 107 of the ASP electronic mall system 108, and is authenticated by the registration processing function 104. In the case of new membership registration, the name (Mr. Y) is input to acquire a user ID, a password and the term of validity. These information are registered in the membership DB 109. This is also the case with the new registration of an ASP. The ASP also registers, deletes or updates an application he owns, in the ASP mall in the following manner. For registration, the user registers, through a network, the application name (application A), the utilization charge per unit time (300 yen), a linkable application (application A), the classification category name of the application (document preparation) and the application A proper. These information are then registered in the ASP registration DB 105. For deleting an application, an application name (application B) is designated and deleted from the ASP registration DB 105. An application is updated, on the other hand, by designating an application name (application C) and selecting an attribute to be updated (utilization charge of 100 yen). In this way, the ASP registration DB 105 is updated to a new attribute (utilization charge of 200 yen). The program file of an application can be updated in the same manner as a new application is registered. When the user and the ASP make a registration in the membership DB 109, the process for settling the account of the admission fee is performed by the settlement infrastructure function 103.

The user who is authenticated and has successfully logged in searches for an intended application through the information search function 101. As the result of search using a category name (document preparation) as a search key, for example, the application A (source: ASP 1, utilization charge: 300 yen/h, link application: a, category: document preparation) is selected. The selected application is called by the application execution function 102 and becomes executable. In the process, the standard application and an application that can be linked with the application selected by the user are also called and become executable. The executable state is defined as a state in which an application to be utilized is turned into an icon by the application execution interface and displayed on the user interface. In the case where the utilization in bench mark mode is desired for the application selected by the user, the bench mark button is clicked. The application that can be executed in bench mark mode can be selected. In that case, the test use for not longer than a predetermined length of time (5 minutes), during which the application execution function 102 takes a log of the application utilization time, is free of charge. Once the predetermined length of time (5 minutes) is exceeded, however, the application execution function 102 takes a log of the application utilization time and the charge is levied in the same manner as in normal mode. In the case where an application is utilized not in bench mark mode but in normal mode, the user clicks the icon of the application A (source: ASP 1, utilization charge: 300 yen/h, link application: a, category: document preparation). The body of the application A existing in the ASP registration DB 105 is started and becomes usable as it is displayed on the application execution screen. At the same time, the application execution function 102 prepares the account pending file 106 and records the application utilization start time in the "start" column of ASP 1. In the case where the application B (source: ASP 2, utilization charge: 100 yen/h, link application: nil, category: search) is utilized, on the other hand, the application execution function 102 generates the next record on the account pending file 106, and records the application utilization start time in the "start" column of ASP 2. At the end of utilization of the application B, the application execution function 102 records the application utilization end time in the "end" column of ASP 2 in the account pending file 106. Once the user logs out, the line is disconnected and the utilization end time of the application A is also recorded. Upon the log-out of the user, the settlement infrastructure function 103 reads the account pending file 106, and calculates the utilization time of the applications A and B (by subtracting the start time from the end time). This calculation is made for all the records, and the utilization time is calculated for each ASP (2 hrs for ASP 1, one hr for ASP 2). The total time thus calculated is collated with the utilization charge rate stored in the ASP registration DB 105 thereby to calculate the amount of the utilization charge (2 hrs×300 yen=600 yen for ASP 1, and 1 hr×100 yen=100 yen for ASP 2). The amounts of the charge calculated for the respective ASPs are totaled to figure out the total utilization charge of the particular user (600 yen+100 yen=700 yen). The total amount of the utilization charge for the user and the utilization charge calculated for each ASP are collectively settled by the settlement infrastructure function 103.

The embodiment described above presupposes that the user becomes a member of the ASP mall. Nevertheless, the user who is not a member of the ASP mall can utilize an application of the ASP mall in bench mark mode. In that case, the user accesses the ASP mall server 107, and when authenticated by the registration processing function 104, logs in by receiving the issue of a guest ID for test using the application without membership registration. In this way, the user can test utilize the application for a predetermined length of time. Also, in the case where a common operating system (OS) is prepared as an infrastructure for the ASP mall and each ASP develops an application in accordance with the specification of the mall OS, then the linkage between all the applications of a plurality of ASPs becomes possible thereby to facilitate the data exchange between applications.

According to this invention, from the viewpoint of the user desirous of utilizing various applications of the ASPs, a multiplicity of ASPs can be bundled through the ASP mall. For this reason, unlike in the prior art requiring many-to-many agreements, only an agreement equivalent to one-to-one agreement suffices, so that each user is not required to be conscious of the other party in settling the account. Also, the applications of different ASPs can be linked with each other, and the performance of each of the applications can be evaluated. Thus, an application most suitable for an intended service can be utilized. Further, each ASP can register any application subsidiary to a main application without constructing an ASP environment by itself.

It should be further understood by those skilled in the art that the foregoing description has been made on embodiments of the invention and that various changes and modifications may be made in the invention without departing from the spirit of the invention and scope of the appended claims.

The invention claimed is:

1. An electronic mall system, comprising:
an application service provider registration database operable to store information for a plurality of application service providers, utilization charge rates for a plurality of applications provided by the plurality of application service providers, and utilization categories to which the plurality of applications belong;
a reception interface operable to receive an application search request from a user terminal via a network, the application search request specifying one of the utilization categories; and
a processing unit operable to:
search the application service provider registration database based on the utilization category specified in the received application search request;
send information to the user terminal to display a selection screen for selecting at least one of the applications located during the search step;
execute a first application and store a first execution start time into a first utilization time management file associated with the first application when receiving a first application execution request from the user terminal;

check whether an execution request of any other application is received from the user terminal;

execute a second application and store a second execution start time into a second utilization time management file associated with the second application when receiving a second application execution request from the user terminal, the second application being able to share data with the first application;

store a first execution end time for the first application and a second execution end time for the second application into the first and second utilization time management files, respectively, when detecting a log out of the user terminal;

calculate a first execution time for the first application from the first execution start time and the first execution end time stored in the first utilization time management file and a second execution time for the second application from the second execution start time and the second execution end time stored in the second utilization time management file;

calculate a utilization charge for each application service provider and a total utilization charge for a user of the user terminal using the first and second execution times and the utilization charge rates in the application service provider registration database; and perform a settlement process for each application service provider and the user.

2. An electronic mall system according to claim 1, further comprising means for executing an application in bench mark mode, and bench mark means for preventing the utilization charge from being levied for an application executed in bench mark mode for not longer than a threshold amount of time by the user desirous of checking the performance of the application.

* * * * *